US010033622B2

(12) United States Patent
Pandya et al.

(10) Patent No.: US 10,033,622 B2
(45) Date of Patent: Jul. 24, 2018

(54) CONTROLLER-BASED DYNAMIC ROUTING IN A SOFTWARE DEFINED NETWORK ENVIRONMENT

(71) Applicant: LENOVO Enterprise Solutions (Singapore) PTE. LTD., New Tech Park (SG)

(72) Inventors: Vaishali V. Pandya, San Jose, CA (US); Malathi K. Nagamangala, Cupertino, CA (US); Shi Xin Ruan, Shanghai (CN); Tamanna Sait, San Jose, CA (US); Venkatesan Selvaraj, San Jose, CA (US); Na Zhu, Shanghai (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 362 days.

(21) Appl. No.: 14/820,768

(22) Filed: Aug. 7, 2015

(65) Prior Publication Data
US 2017/0041211 A1 Feb. 9, 2017

(51) Int. Cl.
*H04L 12/751* (2013.01)
*H04L 12/721* (2013.01)
*H04L 12/713* (2013.01)

(52) U.S. Cl.
CPC .............. *H04L 45/02* (2013.01); *H04L 45/26* (2013.01); *H04L 45/44* (2013.01); *H04L 45/586* (2013.01)

(58) Field of Classification Search
None
See application file for complete search history.

(56) References Cited

U.S. PATENT DOCUMENTS

| 8,787,388 | B1 * | 7/2014 | Adams .................... H04L 45/38 370/244 |
| 9,413,644 | B2 * | 8/2016 | Agarwal ................. H04L 45/44 |
| 9,450,817 | B1 * | 9/2016 | Bahadur ................. H04L 45/64 |
| 9,548,930 | B1 * | 1/2017 | Hardie .................... H04L 47/18 |
| 9,571,338 | B2 * | 2/2017 | Kamble .................. H04L 41/08 |
| 9,575,782 | B2 * | 2/2017 | Chandrashekhar ... H04L 45/741 |

(Continued)

OTHER PUBLICATIONS

R. Cohen K. Barabash V. Jain R. Recio B. Rochwerger "DOVE: Distributed overlay virtual network architecture" 2012.*

(Continued)

*Primary Examiner* — Ayaz R Sheikh
*Assistant Examiner* — Tarell A Hampton
(74) *Attorney, Agent, or Firm* — Kunzler, PC (57) ABSTRACT

Apparatuses, methods, systems, and program products are disclosed for controller-based dynamic routing in a software defined network environment. A gateway module receives a routing protocol control packet at a virtual gateway of a software defined network ("SDN"). The SDN includes one or more virtual gateways that connect the SDN to one or more external networks. A routing control module forwards the received routing protocol control packet to a controller for the SDN. The SDN controller updates a routing information base for the SDN based on the received routing protocol control packet. An update module sends at least a portion of the routing information base to one or more external routers connected to the SDN.

18 Claims, 5 Drawing Sheets

(56) References Cited

U.S. PATENT DOCUMENTS

| | | | |
|---|---|---|---|
| 2008/0144627 A1* | 6/2008 | Ballantyne | H04L 12/4633 370/392 |
| 2009/0037607 A1* | 2/2009 | Farinacci | H04L 12/4641 709/249 |
| 2011/0142053 A1* | 6/2011 | Van Der Merwe | H04L 47/72 370/395.1 |
| 2015/0049631 A1* | 2/2015 | Heron | H04L 45/02 370/254 |
| 2015/0256455 A1* | 9/2015 | Suzuki | H04L 45/74 370/392 |
| 2015/0263946 A1* | 9/2015 | Tubaltsev | H04L 45/586 370/392 |
| 2015/0271102 A1* | 9/2015 | Antich | H04L 47/825 370/230 |
| 2015/0281066 A1* | 10/2015 | Koley | H04L 49/70 370/392 |
| 2015/0319078 A1* | 11/2015 | Lee | H04L 12/6418 370/392 |
| 2015/0381493 A1* | 12/2015 | Bansal | H04L 45/30 370/392 |
| 2016/0014787 A1* | 1/2016 | Zhang | H04W 4/005 370/329 |
| 2016/0094668 A1* | 3/2016 | Chang | H04L 67/16 709/223 |
| 2016/0119417 A1* | 4/2016 | Fang | H04L 67/1095 709/219 |
| 2016/0218917 A1* | 7/2016 | Zhang | H04L 49/35 |
| 2016/0380812 A1* | 12/2016 | Chanda | H04L 41/0803 709/220 |

OTHER PUBLICATIONS

Recio, Renato. "OpenFlow in Enterprise Data Centers Products, Lessons and Requirements." Open Networking Summit 2012 (2012).*

Recio, Renato. "The coming decade of system networking discontinuities." OFC/NFOEC. 2013.*

* cited by examiner

CONTROLLER-BASED DYNAMIC ROUTING IN A SOFTWARE DEFINED NETWORK ENVIRONMENT

FIELD

The subject matter disclosed herein relates to networking and more particularly relates to controller-based dynamic routing in a software defined network.

BACKGROUND

Description of the Related Art

Networked computing environments, such as a software defined network, can include hundreds or thousands of network devices, such as switches, routers, bridges, servers, etc. Software defined networks can utilize an overlay network infrastructure, such as a Distributed Overlay Virtual Ethernet ("DOVE") to help alleviate some of the overhead involved in network management by abstracting the control plane from the physical infrastructure of the network. Software defined networks, however, can become cumbersome to maintain when virtual networks that each include a number of virtual machines are created within the software defined network. Of particular importance is being able to dynamically manage network traffic routing between the devices within the software defined network, such as virtual machines connected to a virtual network, and devices external to the software defined network without manually configuring or provisioning the physical devices connected to the network.

BRIEF SUMMARY

An apparatus for controller-based dynamic routing in a software defined network environment is disclosed. A method and computer program product also perform the functions of the apparatus.

The apparatus, in one embodiment, includes a gateway module that receives a routing protocol control packet at a virtual gateway of a software defined network ("SDN"). The SDN may include one or more virtual gateways that connect the SDN to one or more external networks. In another embodiment, the apparatus includes a routing control module that forwards the received routing protocol control packet to a controller for the SDN. The SDN controller may update a routing information base for the SDN based on the received routing protocol control packet. The apparatus, in a further embodiment, includes an update module that sends at least a portion of the routing information base to one or more external routers connected to the SDN.

In one embodiment, the routing information base is updated on the SDN controller without processing the received routing protocol control packet on the virtual gateway. In a further embodiment, the SDN comprises one or more virtual networks that each include one or more virtual machines. The apparatus, in a further embodiment, includes a virtual machine module that sends routing information to the SDN controller in response to a virtual machine being one of added to or removed from the SDN. The SDN controller may update the routing information base according to the received routing information. In some embodiments, the SDN controller updates the routing information base without configuring one or more physical components of an underlying network.

In a further embodiment, the routing information for a virtual machine includes one or more of an internet protocol ("IP") address for the virtual machine and a subnet address for the virtual machine. In one embodiment, the SDN includes a Distributed Overlay Virtual Ethernet ("DOVE") network. In some embodiments, the update module sends the routing information base to the one or more external routers using one of the virtual gateway, a DOVE management console, a DOVE connectivity service, and the SDN controller.

In some embodiments, a routing protocol for the SDN is executed as a service on the SDN controller. The routing protocol may process the routing protocol control packet on the SDN controller. In another embodiment, the routing protocol includes one of a border gateway protocol and an open shortest path first protocol. In a further embodiment, the routing control module forwards the received routing protocol control packet to the SDN controller using a network tunneling protocol. In various embodiments, the one or more external routers include one or more physical routers connected to the internet.

The method, in one embodiment, includes receiving a routing protocol control packet at a virtual gateway of a software defined network ("SDN"). The SDN may include one or more virtual gateways that connect the SDN to one or more external networks. In another embodiment, the method includes forwarding the received routing protocol control packet to a controller for the SDN. The SDN controller may update a routing information base for the SDN based on the received routing protocol control packet. The method, in a further embodiment, includes sending at least a portion of the routing information base to one or more external routers connected to the SDN.

In a further embodiment, the routing information base is updated on the SDN controller without processing the received routing protocol control packet on the virtual gateway. In another embodiment, the SDN includes one or more virtual networks that each include one or more virtual machines. In some embodiments, the method includes sending routing information to the SDN controller in response to a virtual machine being one of added to or removed from the SDN. The SDN controller may update the routing information base according to the received routing information.

In one embodiment, the SDN controller updates the routing information base without configuring one or more physical components of an underlying network. In another embodiment, the SDN includes a Distributed Overlay Virtual Ethernet ("DOVE") network. In a further embodiment, the routing information base is sent to the one or more external routers using one of the virtual gateway, a DOVE management console, a DOVE connectivity service, and the SDN controller.

A program product that includes a computer readable storage medium that stores code executable by a processor includes code to perform receiving a routing protocol control packet at a virtual gateway of a software defined network ("SDN"). The SDN may include one or more virtual gateways that connect the SDN to one or more external networks. In another embodiment, the executable code includes code to perform forwarding the received routing protocol control packet to a controller for the SDN. The SDN controller may update a routing information base for the SDN based on the received routing protocol control packet. In some embodiments, the executable code includes code to perform sending at least a portion of the routing information base to one or more external routers connected to the SDN.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
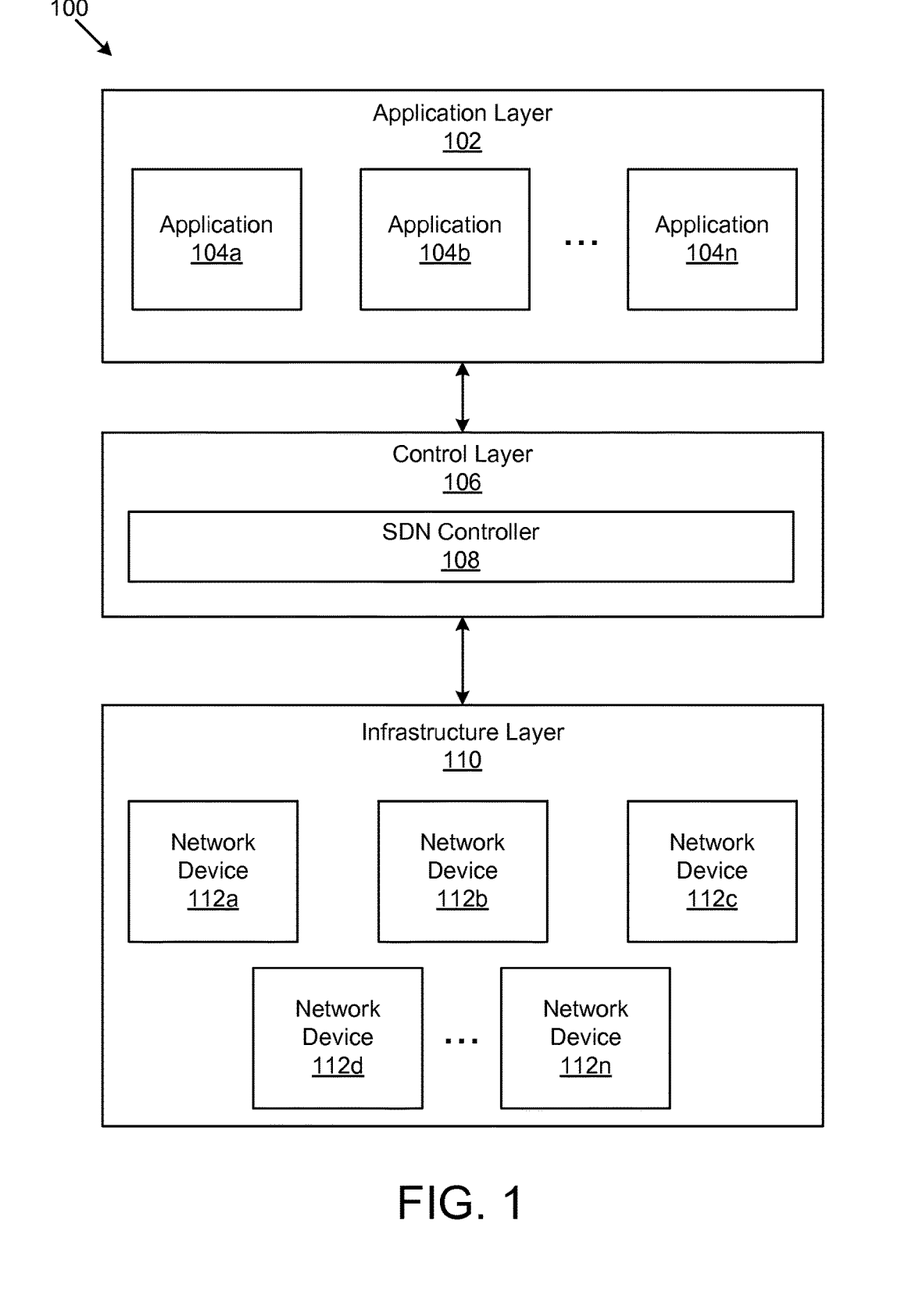
FIG. 1 is a schematic block diagram illustrating one embodiment of a system for controller-based dynamic routing in a software defined network environment.

FIG. 1 is a schematic block diagram illustrating one embodiment of a system 100 for controller-based dynamic routing in a software defined network ("SDN") environment. An SDN, as used herein, is a computer network that allows management of network services through abstraction of lower-level functionality, such as by decoupling the control plane (the part of the network that makes decisions about where traffic is sent) from the data plane (the part of the network that forwards traffic to selected destinations). Details of the SDN 202 are explained more thoroughly with reference to FIG. 2.

Accordingly, an SDN controller 108 may provide programmatic interfaces into network equipment, such as switches and routers, which may traditionally be configured with closed, proprietary firmware. In this manner, manual interfaces into networking equipment can be replaced with a programmatic interface that can enable the automation of tasks, such as configuration and policy management, and also enable the network to dynamically respond to application requirements. The SDN 202 may include a network environment in a data center where clients are accessing servers, virtual machines, or other endpoints through the SDN 202. In another embodiment, the SDN 202 may include a networked environment that facilitates the transmission of data between two or more clients.

The system 100, in one embodiment, includes an application layer 102, which includes one or more applications 104a-n, a control layer 106, which includes an SDN controller 108, and an infrastructure layer 110, which includes one or more network devices 112a-n.

In one embodiment, the application layer 102 includes an abstraction layer of the SDN 202 that includes the applications or services 104a-n that utilize the SDN 202. In certain embodiments, the applications 104a-n communicate with the SDN controller 108 within the control plane 106 to plan, organize, orchestrate, automate, or the like the flow of traffic through the network devices 112a-n in the infrastructure layer 110. The SDN controller 108 may provide application programming interfaces ("APIs") that the applications 104a-n can use to programmatically customize and optimize the SDN 202 for different uses. For example, the applications 104a-n may include network load balancers, switch/network virtualization applications, firewalls, software-defined security services, or the like that could be optimized in an SDN environment.

In one embodiment, the control layer 106 includes an abstraction layer of the SDN 202 that controls the flow of traffic through the SDN 202 (through the infrastructure layer 110, for example). For example, the control layer 106 may include an SDN controller 108 that acts as a strategic control point for the SDN 202 and controls the flow of network packets through the infrastructure layer 110.

The SDN controller 108, in certain embodiments, is configured to relay information, messages, data packets, or the like, to the network devices 112*a-n* in the infrastructure layer 110 and the applications 104*a-n* in the application layer 102. For example, the SDN controller 108 may dynamically plan how network packets are routed through the infrastructure layer 110 according to the needs and/or demands of the applications 104*a-n*. In this manner, by separating the control layer 106 from the infrastructure layer 110, unlike traditional networking configurations, more sophisticated traffic management is possible instead of using access control lists and routing protocols.

The SDN controller 108 may communicate with the network devices 112*a-n* in the infrastructure layer 110 using different communication protocols and APIs that define how the SDN controller 108 communicates with the network devices 112*a-n* in the infrastructure layer 110 to make adjustments to the packet routing/forwarding paths as determined by the needs of the applications 104*a-n*. Examples of communication protocols between the SDN controller 108 and the network devices 112*a-n* include OpenFlow® by the Open Networking Foundation and OpFlex by Cisco®. OpenFlow®, for example, allows remote administration of packet forwarding tables, by adding, modifying and removing packet matching rules and actions. In this manner, routing decisions can be made periodically or ad hoc by the SDN controller 108 and translated into rules and actions.

The infrastructure layer 110 includes an abstraction layer of the SDN 202 that includes a plurality of physical network devices 112*a-n* that perform transmission and/or forwarding of network traffic through the SDN 202 according to the packet routing paths determined by the SDN controller 108. As described above, the SDN controller 108 may be in communication with the network devices 112*a-n* of the infrastructure layer 110 using a communications protocol such as OpenFlow®. In one embodiment, the network devices 112*a-n* may include networking equipment and endpoints, such as switches, routers, bridges, firewalls, servers, virtual machines, hypervisors, or the like.

Figure 2:
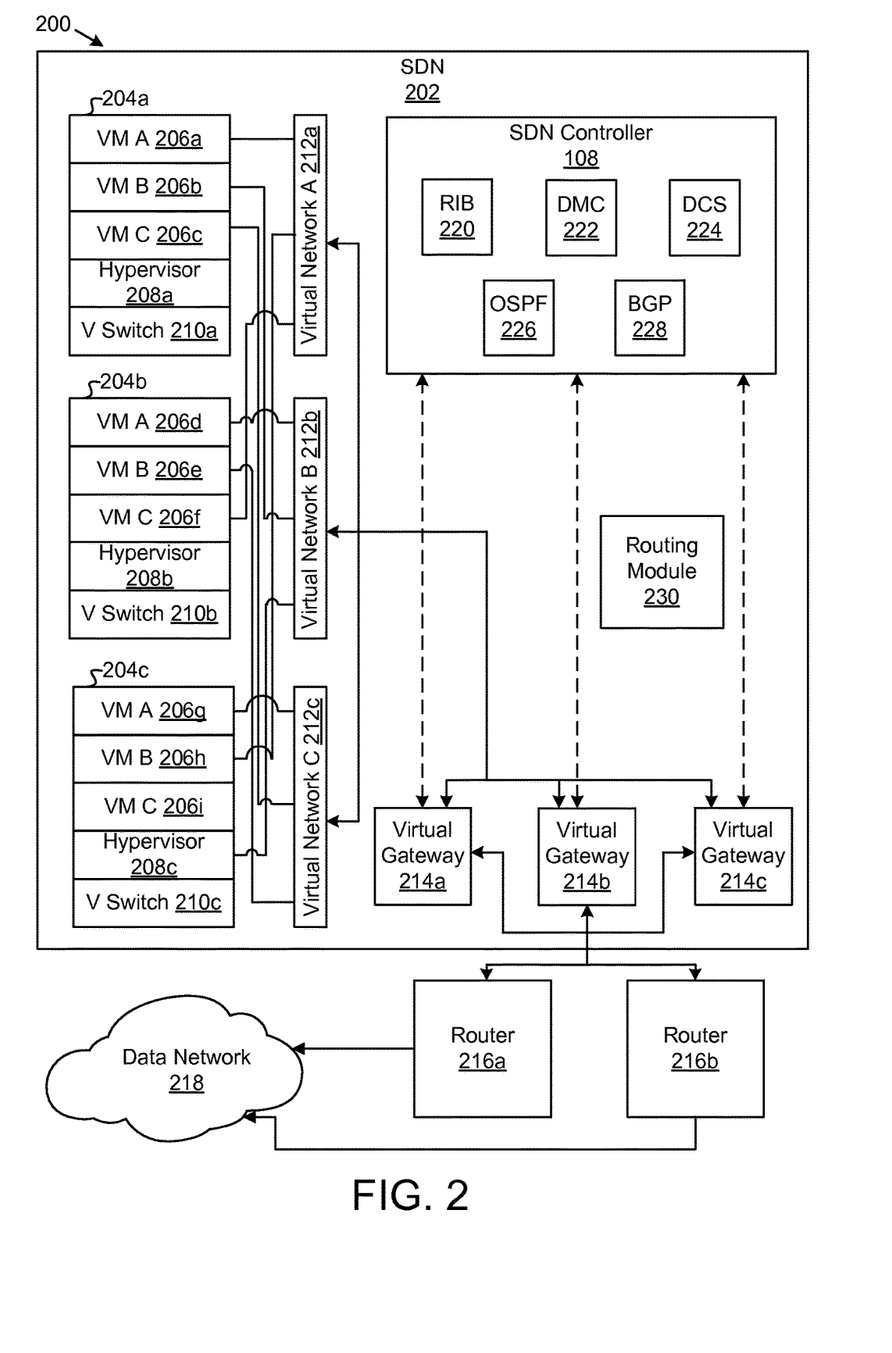
FIG. 2 is a schematic block diagram illustrating one embodiment of another system for controller-based dynamic routing in a software defined network environment.

FIG. 2 is a schematic block diagram illustrating one embodiment of another system 200 for controller-based dynamic routing in a software defined network environment. The system 200 depicts an SDN 202 that includes a plurality of virtual machines 206*a-i* executing on a plurality of host devices 204*a-c*. The host devices 204*a-c* may also include hypervisors 208*a-c* that manage execution of the virtual machines 206*a-i*. The host devices 204*a-c* may also include a plurality of virtual switches 210*a-c* (hereinafter known as "v-switches 210*a-c*").

The SDN 202, in certain embodiments, includes a plurality of virtual networks 212*a-c*, a plurality of virtual gateways 214*a-c*, a routing module 230, and an SDN controller 108 that may include one or more of a routing information base ("RIB") 220, a DOVE management console ("DMC") 222, and a DOVE connectivity service ("DCS") 224. The SDN controller 108 may also run one or more routing protocol services, such as an open shortest path first ("OSPF") protocol 226, a border gateway protocol ("BGP") 228, or the like. The system 200 may also include one or more external routers 216*a-b* connected to the SDN 202, and an external data network 218.

The host devices 204*a-c* may include servers, desktop computers, laptop computers, cloud servers, network servers, or the like that are configured to execute a virtual environment. The virtual environment may include a hypervisor 208*a-c* and one or more v-switches 210*a-c*. Examples of available virtual environments may include VirtualBox® by Oracle Corp. of Redwood City, Calif., Virtual PC® by Microsoft Corp. of Redmond, Wash., VMware® by VMware, Inc. of Palo Alto, Calif., or the like. The host devices 204*a-c* may be located in the same data center or may be located remotely from one another in different data centers and connected via an external data network 218, such as the internet.

In one embodiment, the virtual machines 206*a-i*, as used herein, are operating systems or application environments that are installed on software that imitates dedicated hardware. Accordingly, an end user has the same experience on a virtual machine 206*a-i* as they would have on a dedicated hardware. The hypervisors 208*a-c*, as used herein, emulate the host devices 204*a-c* processor, memory, hard disk, network, and other hardware resources and enables the virtual machines 206*a-i* to share the resources. As is known in the art, the hypervisors 208*a-c* can emulate multiple virtual hardware platforms to allow virtual machines 206*a-i* to execute different types of operating systems such as Windows®, Linux®, or OS X® on the same host device 204*a-c*.

The virtual environment, in one embodiment, also includes virtual switches 210*a-c*. As used herein, v-switches 210*a-c* facilitate network communication between a plurality of virtual machines 206*a-i* within a hypervisor 208*a-c*, similar to an Ethernet switch. The v-switches 210*a-c* may also facilitate the creation and functionality of one or more virtual networks 212*a-c*. A virtual network 212*a-c*, as used herein, is a computer network that includes virtual network links, which do not consists of physical (wired or wireless) connections between two endpoints, but are implemented using network virtualization.

Virtual networks 212*a-c* may be based on virtual devices, such as networks that connect virtual machines 206*a-i* within a hypervisor 208*a-c* using v-switches 210*a-c*. The v-switches 210*a-c* route traffic between different virtual machines 206*a-i* on a hypervisor 208*a-c*. Virtual networks 212*a-c* may also include protocol-based virtual networks such as VLANs, virtual private networks ("VPNs"), virtual private LAN services ("VPLSs"), or the like. VLANs, for example, are logical local area networks ("LANs") that are based on physical LANs. A VLAN can be created by partitioning a physical LAN into multiple logical LANs by using a VLAN ID. Alternatively, several physical LANs can function as a single logical LAN. Virtual networks 212*a-c* can include a combination of protocol-based and virtual device-based methods.

The SDN 202 may also include one or more virtual gateways 214*a-c*. The virtual gateways 214*a-c* may be virtual routers, which, as used herein, are routers embodied as software objects that facilitate the transmission of data packets into, out of, and throughout the SDN 202. In some embodiments, the virtual gateways 214*a-c* are virtual routers that sit at the edge of the SDN 202 and are in communication with one or more external routers 216*a-b* to facilitate the transmission of data packets into and out of the SDN 202. The one or more external routers 216*a-b* may include physical and/or virtual routers connected to one or more data networks 218 that are external to the SDN 202, such as the internet.

The SDN 202, in one embodiment, is embodied as an overlay network. An overlay network, as used herein, is a computer network that is built on top of another network where components within the network are connected using virtual or logical links that each correspond to a physical path in the underlying network. The overlay network, in one embodiment, includes a Distributed Overlay Virtual Ethernet ("DOVE®") by IBM® of Armonk, N.Y. DOVE, as used herein, is an overlay architecture that abstracts the physical network infrastructure, e.g., the infrastructure layer 110, from the hypervisors 208a-c running on the host devices 204a-c.

In some embodiments, DOVE uses distributed v-switches 210a-c associated with the hypervisors 208a-c to create tunnels between endpoints, such as virtual machines 206a-i, across the underlying network infrastructure layer 110. In one embodiment, the v-switches 210a-c in a DOVE architecture include DVS 5000v v-switches 210a-c created by IBM®. In certain embodiments, the v-switches 210a-c are connected to one another using the internet protocol ("IP") and can connect to any subnetwork, e.g., any virtual network 212a-c, within the SDN 202 using IP.

In a DOVE architecture, the virtual gateways 214a-c connect the DOVE-enabled SDN 202 to one or more external networks 218 such that any communications from the virtual machines 206a-i intended for an external network 218 travels through a virtual gateway 214a-c. The virtual gateways 214a-c, in some embodiments, are configured to encapsulate data packets flowing into the DOVE-enabled SDN 202 from an external router 216a-b with DOVE-specific header information so that the data packets can be transmitted within the DOVE-enabled SDN 202. The virtual gateways 214a-c may also be responsible for delivering the DOVE-encapsulated data packets to the intended destination, e.g., the v-switch 210a-c associated with the intended virtual machine 206a-i. Furthermore, the virtual gateways 214a-c are configured to decapsulate, or remove DOVE-specific header information, from data packets received from the virtual machines 206a-i and intended for a destination on the external data network 218.

In the DOVE-enabled SDN 202, logical groups of virtual machines 206a-i, i.e., virtual networks 212a-c, can be created and identified using a virtual network identifier ("VNID"), which may be a 24-bit identifier, similar to virtual extensible LAN ("VXLAN") technology. In one embodiment, the subnet of a VNID group can be configured in a shared mode or a dedicated mode. In a dedicated mode, the IP address of a virtual machine 206a-i sending a data packet is not exposed to networks or devices external to the SDN 202, such as the external routers 216a-b or the external network 218, using network address translation ("NAT").

A virtual machine group configured in a shared mode uses the IP address of the virtual machine 206a-i as the source address of data packets sent from the virtual machine 206a-i. Accordingly, in order for external communications to be sent to a virtual machine 206a-i in a shared mode, the IP address of the virtual machine 206a-i, and/or the subnet of the virtual machine group, may be advertised to the external routers 216a-b so that the communication link between the external routers 216a-b and the virtual machine 206a-i can be established without manually provisioning the external routers 216a-b with the IP address of the virtual machine 206a-i and/or the subnet of the virtual machine group.

Traditionally, in a DOVE-enabled SDN 202 that does not employ dynamic routing, external routers 216a-b are configured with the subnet of the virtual machine group in a shared mode. For example, in order for a virtual machine 206a-i with an IP address 12.12.12.100/24 to communicate with an external router 216a-b, the external router 216a-b would be configured with an IP address in the same subnet, e.g., 12.12.12.2/24. This adds the administrative burden of configuring physical switches or routers with the IP address of a virtual machine 206a-i when the virtual machine 206a-i is added to, or removed from, a v-switch 210a-c behind a virtual gateway 214a-c.

Thus, it would be beneficial, and more flexible, to avoid manually provisioning or configuring any physical components of the underlying network with routing information when a virtual machine 206a-i is added or removed from the SDN 202. For example, once the virtual gateways 214a-c and the external routers 216a-b are initially configured, virtual machines 206a-i may be added to or removed from the SDN 202, or deployed in any subnet or virtual network 212a-c of the SDN 202, without any additional configuration of switches, routers, or the like of the underlying physical infrastructure of the network with routing information for the added or removed virtual machines 206a-i. Furthermore, the IP address and/or the subnet of the virtual machines 206a-i may be advertised to external networking devices by the routing module 230 described below.

The routing module 230, in one embodiment, is configured to receive a routing protocol control packet at a virtual gateway 214a-c and forward the routing protocol control packet to the SDN controller 108 (denoted by the dashed lines in FIG. 2). As used herein, a routing protocol specifies how routers communicate with each other and a routing protocol control packet is a data packet that includes routing information to enable routers to select routes between any two nodes in a computer network. Different routing protocols implement different routing algorithms to determine the specific choice of route. For example, an OSPF routing protocol 226 uses a link state routing algorithm for interior network routing, such as routing with the SDN 202. A BGP routing protocol 228, on the other hand, is an exterior gateway protocol designed to exchange routing and reachability information between different autonomous systems ("AS") using a distance-vector algorithm. In some embodiments, the routing protocol is a dynamic routing protocol that creates, modifies, updates, etc., routing tables automatically based on information carried in routing protocol control packets.

In such an embodiment, the SDN controller 108 executes an instance of a routing protocol as a service, such as OSPF 226, BGP 228, and/or the like. For example, the SDN controller 108 may run an instance of OSPF v2/v3 or BGP for routing network traffic in a network that uses IPv4, IPv6, or the like. The routing module 230, in certain embodiments, dynamically updates a routing information base ("RIB") 220 for the SDN 202 based on the routing information in the received routing control packet. Traditionally, each virtual gateway 214a-c executes its own routing protocol (OSPF 226, BGP 228, etc.) and maintains a distinct and independent instance of a RIB 220. Accordingly, as the number of virtual gateways 214a-c increases, the amount of overhead and administration increases to maintain the routing protocols 226, 228 and RIBs 220 on each virtual gateway 214a-c.

Thus, instead of distributing the routing protocols 226, 228 and RIBs 220 among each virtual gateway 214a-c, the routing module 230 maintains a centralized RIB 220 for the entire SDN 202 on the SDN controller 108. When the SDN controller 108 updates the centralized RIB 220, the routing module 230 sends at least a portion of the RIB 220 to one or more external routers 216a-b, or other interested components, such as v-switches 210a-c, or the like, so that the external routers 216a-b know how to communicate with virtual machines 206a-i and/or other components of the SDN 202. The routing module 230 is described in more detail below with reference to FIG. 3.

In one embodiment, the SDN 202 may include a management console or module that manages and configures the virtual networks, overlays, v-switches 210a-c, virtual gateways 214a-c, or the like. In an SDN 202 that uses a DOVE overlay, the SDN controller 108 may include an instance of a DOVE Management Console ("DMC") 222. The DMC 222, as used herein, is the centralized point of control for managing and configuring the DOVE overlay for the SDN 202. In certain embodiments, the DMC 222 configures each virtual network 212a-c, controls policies, and forwards the policies to the v-switches 210a-c. In other words, the DMC 222 unifies the operation of various virtual components of the SDN 202 within the DOVE overlay. In some embodiments, the DMC 222 is located on one or more different host devices 204a-c connected to the SDN 202.

Furthermore, an SDN 202 may include an instance of a connectivity service that is configured to maintain, process, configure, transmit, share, store, or the like network information for the SDN 202. For example, a connectivity service may distribute or broadcast IP addresses for virtual machines 206a-i, subnet addresses for the virtual networks 212a-c, or the like to various network components, such as the v-switches 210a-c, the virtual gateways 214a-c, the external routers 216a-b, or the like.

An embodiment of an SDN 202 that uses a DOVE overlay may include an instance of a DOVE Connectivity Service ("DCS") 224. The DCS 224, as used herein, disseminates IP addresses for the virtual machines 206a-i to the v-switches 210a-c in the SDN 202. The DCS 224, similar to the DMC 222, may also configure each virtual network 212a-c, control policies, and forward the policies to the v-switches 210a-c. In other words, the DCS 224 collects and processes network information (e.g., routing information) pertaining to virtual machines 206a-i, v-switches 210a-c, and/or virtual gateways 214a-c within the SDN 202.

Figure 3:
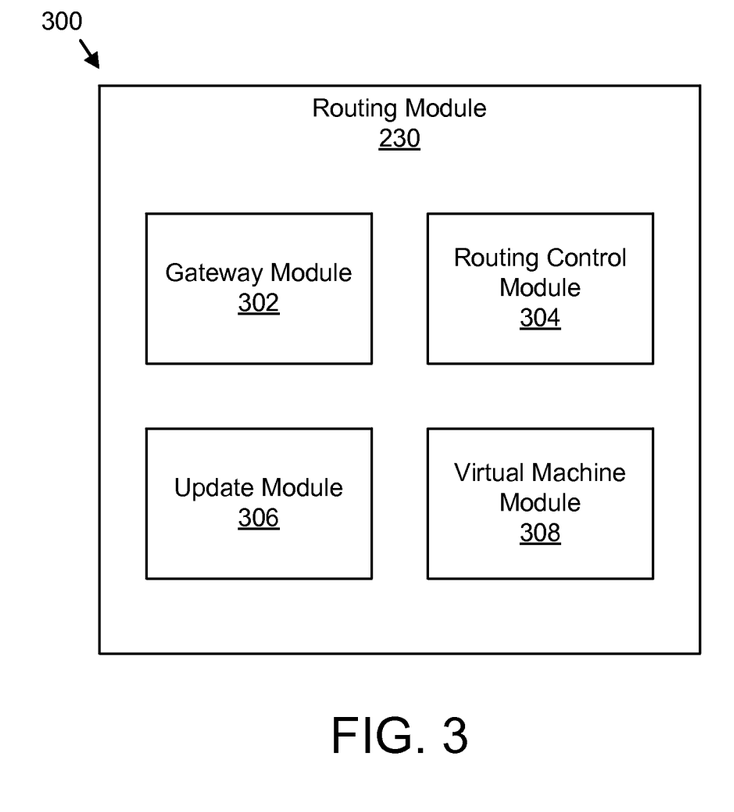
FIG. 3 is a schematic block diagram illustrating one embodiment of a module for controller-based dynamic routing in a software defined network environment.

FIG. 3 is a schematic block diagram illustrating one embodiment of a module 300 for controller-based dynamic routing in a software defined network environment. In one embodiment, the module 300 includes an embodiment of a routing module 230. The routing module 230, in various embodiments, includes one or more of a gateway module 302, a routing control module 304, an update module 306, and a virtual machine module 308, which are described in more detail below.

The gateway module 302, in one embodiment, is configured to receive a routing protocol control packet at a virtual gateway 214a-c of the SDN 202. A shown in FIG. 2, the SDN 202 may include one or more virtual gateways 214a-c that form the edge of the SDN 202 and connect the devices within the SDN 202 to one or more external routers 216a-b and/or data networks 218. In certain embodiments, the virtual gateways 214a-c are DOVE virtual gateways 214a-c configured for a DOVE overlay for the SDN 202.

In certain embodiments, the gateway module 302 receives a routing protocol control packet at a virtual gateway 214a-c from a virtual machine 206a-i within the SDN 202 and intended for a remote network 218 via an external router 216a-b. In some embodiments, the gateway module 302 receives a routing protocol control packet at a virtual gateway 214a-c from an external router 216a-b. The routing protocol control packet, as described above, includes routing information for a device, such as a virtual machine 206a-i, that network components can use to forward traffic to and/or from the device. For example, the routing protocol control packet may include the IP address and/or subnet address of a virtual machine 206a-i that has been added to the SDN 202. The routing protocol control packet may be associated with a particular routing protocol, such as OSPF 226, BGP 228, or the like.

In one embodiment, the routing control module 304 is configured to forward the routing protocol control packet received by the gateway module 302 from the virtual gateway 214a-c to the SDN controller 108 (as depicted by the dashed lines connecting the SDN controller 108 to the virtual gateways 214a-c in FIG. 2). In one embodiment, the virtual gateways 214a-c are connected to the SDN controller 108 via a tunneling protocol. As used herein, a tunneling protocol provides encapsulation of a data packet to allow the data packet to be transmitted within a network that does not normally support the data packet. For example, the routing control module 304 may encapsulate the routing protocol control packet using an IP Generic Routing Encapsulation ("GRE"), or other IP tunneling protocol, to forward the routing protocol control packet from the virtual gateway 214a-c to the SDN controller 108.

The routing control module 304, in response to the routing protocol control packet being received at the SDN controller 108, updates the RIB 220 located on the SDN controller with the routing control information contained in the routing protocol control packet. The RIB 220, otherwise known as a routing table, as described above, contains routing information for the SDN 202 that is used to determine where data packets will be directed. Typically, the RIB 220 contains the information necessary to forward a packet along the best path toward its destination. For example, the RIB 220 may contain routing information for the shortest path from a virtual machine 206a-i to a destination location on the data network 218. In addition to the best path, the RIB 220 may contain alternate routing paths for redundancy. The routing control module 304 may update information in the routing table based on the routing information contained in the routing protocol control packet, such as updated IP addresses or subnet address for endpoints (e.g., virtual machines 206a-i, v-switches 210a-c, or the like).

In one embodiment, the routing control module 304 updates the RIB 220 on the SDN controller 108 without processing received routing protocol control packets received on the virtual gateways 214a-c. As discussed above, traditional SDNs 202 that employ a DOVE overlay place a routing protocol and a RIB 220 on each DOVE virtual gateway 214a-c within the DOVE SDN 202 such that the routing protocols 226, 228 and RIBs 220 are distributed among one or more DOVE virtual gateways 214a-c. The subject matter disclosed herein, however, removes the processing of routing control packets from the DOVE virtual gateways 214a-c to a centralized location on the SDN controller 108. Thus, the DOVE virtual gateways 214a-c no longer maintain or execute routing protocols 226, 228 or RIBs 220 separately. Instead, the SDN controller 108 executes the routing protocols 226, 228 as services on the SDN controller 108 and maintains a centralized RIB 220 for the DOVE SDN 220 on the SDN controller 108.

The update module 306, in one embodiment, disseminates at least a portion of the RIB 220 to one or more external routers 216a-b. For example, the update module 306 may send the updated portion of the RIB 220 to the external routers 216a-b so that the external routers 216a-b can update their RIBs 220. In some embodiments, the update module 306 sends the RIB 220 to the external routers 216a-b using a routing protocol 226, 228. The update module 306 may also send the RIB 220 to other devices in addition to the external routers 216a-b, such as the v-switches 210a-c, the virtual gateways 214a-c, or other external switches, bridges, routers, etc. In a DOVE-enabled SDN 202, the update module 306 may push the RIB 220 to the DMC 222 or DCS 224, which may then forward the RIB 220 to the external routers 216*a-b*, the virtual gateways 214*a-c*, the v-switches 210*a-c*, or the like using a routing protocol 226, 228.

In this manner, external devices know how to reach the virtual devices 206*a-i*, 210*a-b*, 214*a-c* within the SDN 202 without requiring manual configuration or provisioning of the virtual gateways 214*a-c*, external routers 216*a-b*, or other networking devices. Accordingly, once the virtual gateways 214*a-c* and external routers 216*a-b* are configured, any virtual machines 206*a-i* can be deployed within any subnet or virtual network 212*a-c* within the SDN 202 without manually configuring any networking devices, such as physical switches, routers, bridges, etc.

The virtual machine module 308, in one embodiment, monitors for new virtual machines 206*a-i* that are instantiated within the SDN 202 on a host device 204*a-c*. The virtual machine module 308, in another embodiment, monitors for virtual machines 206*a-i* that are removed from the SDN 202. In response to detecting a new or removed virtual machine 206*a-i*, the virtual machine module 308 sends updated routing information to the SDN controller 108. For example, if the virtual machine module 308 detects a new virtual machine 206*a-i* has been created on a host device 204*a-c*, the virtual machine module 308 may determine the routing information for the virtual machine 206*a-i*, such as the IP address, the subnet address, or the like and send the routing information to the SDN controller 108. In some embodiments, the virtual machine module 308 encapsulates the routing information as a routing protocol control packet for a particular routing protocol 226, 228 before sending the routing information to the SDN controller 108.

In some embodiments, the virtual machine module 308 detects when a virtual machine 206*a-i* is added to or removed from a virtual network 212*a-c* within the SDN 202. In response to detecting that a virtual machine 206*a-i* has been created, removed, added to or removed from a virtual network 212*a-c*, or the like, the virtual machine module 308 may send routing information for the virtual network 212*a-c*, such as the subnet address of the virtual network 212*a-c* and the IP address of the virtual machine 206*a-i*, so that the routing control module 304 can update the RIB 220 in the SDN controller 108 to reflect the network configuration changes within the SDN 202. Accordingly, the update module 306 may propagate the updated RIB 220 to other internal and/or external network devices 112*a-n*.

Figure 4:
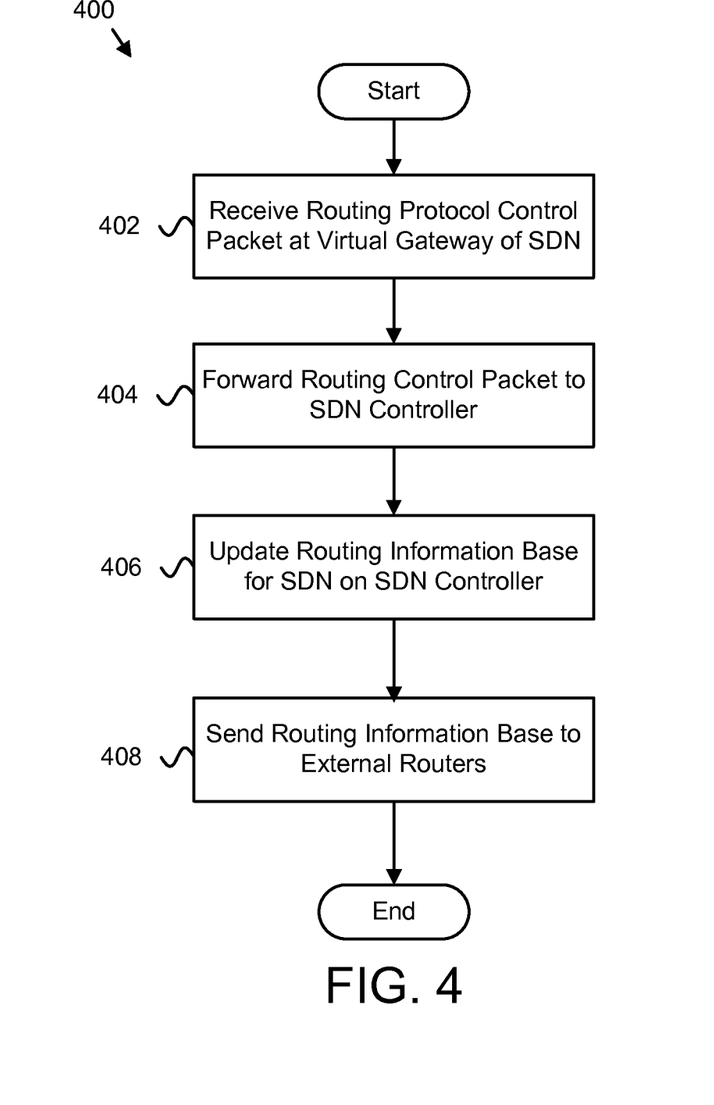
FIG. 4 is a schematic flow chart diagram illustrating one embodiment of a method for controller-based dynamic routing in a software defined network environment.

FIG. 4 is a schematic flow chart diagram illustrating one embodiment of a method 400 for controller-based dynamic routing in a software defined network environment. In one embodiment, the method 400 begins and receives 402 a routing protocol control packet at a virtual gateway 214*a-c* of an SDN 202. In one embodiment, the gateway module 302 receives 402 the routing protocol control packet at a virtual gateway 214*a-c*. In certain embodiments, the SDN 202 includes a DOVE overlay network and the virtual gateways 214*a-c* include DOVE virtual gateways 214*a-c*.

The method 400, in another embodiment, forwards 404 the received routing protocol control packet to the SDN controller 108. In one embodiment, the routing control module 304 forwards 404 the received routing protocol control packet to the SDN controller 108. In certain embodiments, the method 400 forwards 404 the routing protocol control packet to the SDN controller 108 using a tunneling protocol, such as IP GRE.

In a further embodiment, the method 400 updates 406 the RIB 220 stored on the SDN controller 108 for the SDN 202 based on the received routing protocol control packet. In one embodiment, the routing control module 304 updates 406 the RIB 220 stored on the SDN controller 108 based on the received routing protocol control packet. In a further embodiment, the method 400 sends 408 at least a portion of the RIB 220 to one or more external routers 216*a-b*, or other networking devices, connected to the SDN 202. An update module 306, in some embodiments, sends 408 at least a portion of the RIB 220 to one or more external routers 216*a-b* connected to the SDN 202, and the method 400 ends.

Figure 5:
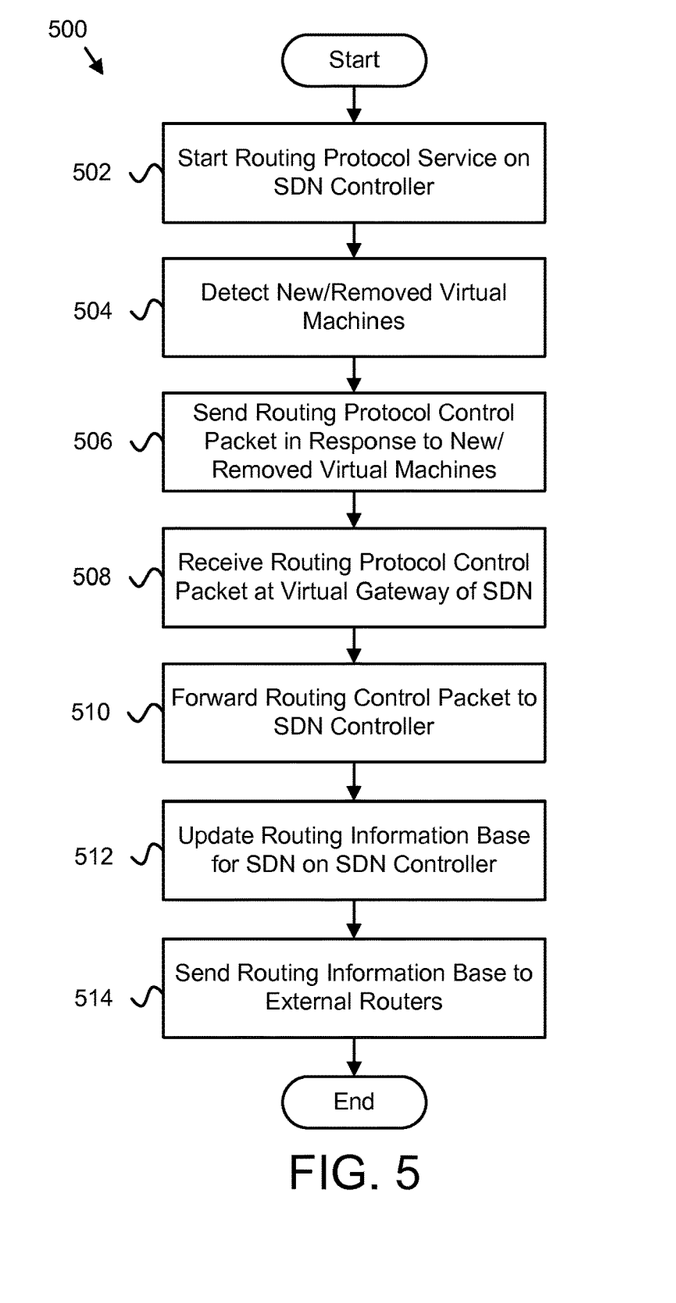
FIG. 5 is a schematic flow chart diagram illustrating one embodiment of another method for controller-based dynamic routing in a software defined network environment.

FIG. 5 is a schematic flow chart diagram illustrating one embodiment of another method 500 for controller-based dynamic routing in a software defined network environment. In one embodiment, the method 500 begins and starts 502 a routing protocol service on the SDN controller 108 for the SDN 202. In one embodiment, the routing protocol service includes an OSPF 226 and/or BGP 228 dynamic routing protocol. In some embodiments, the routing control module 304 starts 502 the routing protocol service on the SDN controller 108.

In a further embodiment, the method 500 detects 504 virtual machines 206*a-i* that are added to and/or removed from the SDN 202, or deployed in or removed from a virtual network 212*a-c* within the SDN 202. In one embodiment, a virtual machine module 308 detects 504 virtual machines 206*a-i* that are added to and/or removed from the SDN 202, or deployed in or removed from a virtual network 212*a-c* within the SDN 202.

In response to detecting a change in the virtual machine 206*a-i* configuration within the SDN 202, the method 500 sends 506 routing information to the SDN controller 108 in the form of a routing protocol control packet. In certain embodiments, the method 500 sends 506 the routing protocol control packet to a virtual gateway 214*a-c* associated with the virtual machine 206*a-i*. In some embodiments, the virtual machine module 308 sends 506 the routing protocol control packet to the SDN controller 108.

In a further embodiment, the method 500 receives 508 the routing protocol control packet at a virtual gateway 214*a-c* of an SDN 202. In one embodiment, the gateway module 302 receives 508 the routing protocol control packet at a virtual gateway 214*a-c*. In certain embodiments, the SDN 202 includes a DOVE overlay network and the virtual gateways 214*a-c* include DOVE virtual gateways 214*a-c*.

The method 500, in another embodiment, forwards 510 the received routing protocol control packet to the SDN controller 108. In one embodiment, the routing control module 304 forwards 510 the received routing protocol control packet to the SDN controller 108. In certain embodiments, the method 500 forwards 510 the routing protocol control packet to the SDN controller 108 using a tunneling protocol, such as IP GRE.

In a further embodiment, the method 500 updates 512 the RIB 220 stored on the SDN controller 108 for the SDN 202 based on the received routing protocol control packet. In one embodiment, the routing control module 304 updates 512 the RIB 220 stored on the SDN controller 108 based on the received routing protocol control packet. In a further embodiment, the method 500 sends 514 at least a portion of the RIB 220 to one or more external routers 216*a-b*, or other networking devices, connected to the SDN 202. An update module 306, in some embodiments, sends 514 at least a portion of the RIB 220 to one or more external routers 216*a-b* connected to the SDN 202, and the method 500 ends. In this manner, the SDN 202, or DOVE-enabled SDN 202, may implement dynamic routing with the SDN 202 through centralization of the routing protocols 226, 228 and RIB 220 in the SDN controller 108, which removes manually provisioning and configuration of networking devices, such as external routers 216a-b, with routing information when the virtual machine configuration changes within the SDN 202 (e.g., when virtual machines 206a-i are added to or removed from the SDN 202 or virtual networks 212a-c within the SDN 202).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a gateway module that receives a routing protocol control packet at a virtual gateway of a software defined network ("SDN"), the SDN comprising one or more virtual gateways that connect the SDN to one or more external networks;
a routing control module that forwards the received routing protocol control packet to a controller for the SDN, the SDN controller updating a routing information base for the SDN based on the received routing protocol control packet; and
an update module that sends at least a portion of the routing information base to one or more external routers connected to the SDN,
wherein the routing information base is updated on the SDN controller without processing the received routing protocol control packet on the virtual gateway.

2. The apparatus of claim 1, wherein the SDN comprises one or more virtual networks, each virtual network comprising one or more virtual machines.

3. The apparatus of claim 2, further comprising a virtual machine module that sends routing information to the SDN controller in response to a virtual machine being one of added to or removed from the SDN, the SDN controller updating the routing information base according to the received routing information.

4. The apparatus of claim 3, wherein the SDN controller updates the routing information base without configuring one or more physical components of an underlying network.

5. The apparatus of claim 3, wherein the routing information for a virtual machine comprises one or more of an internet protocol ("IP") address for the virtual machine and a subnet address for the virtual machine.

6. The apparatus of claim 1, wherein the SDN comprises a Distributed Overlay Virtual Ethernet ("DOVE") network.

7. The apparatus of claim 6, wherein the update module sends the routing information base to the one or more external routers using one of the virtual gateway, a DOVE management console, a DOVE connectivity service, and the SDN controller.

8. The apparatus of claim 1, wherein a routing protocol for the SDN is executed as a service on the SDN controller, the routing protocol processing the routing protocol control packet on the SDN controller.

9. The apparatus of claim 8, wherein the routing protocol comprises one of a border gateway protocol and an open shortest path first protocol.

10. The apparatus of claim 1, wherein the routing control module forwards the received routing protocol control packet to the SDN controller using a network tunneling protocol.

11. The apparatus of claim 1, wherein the one or more external routers comprise one or more physical routers connected to the internet.

12. A method comprising:
receiving a routing protocol control packet at a virtual gateway of a software defined network ("SDN"), the SDN comprising one or more virtual gateways that connect the SDN to one or more external networks;
forwarding the received routing protocol control packet to a controller for the SDN, the SDN controller updating a routing information base for the SDN based on the received routing protocol control packet; and
sending at least a portion of the routing information base to one or more external routers connected to the SDN,
wherein the routing information base is updated on the SDN controller without processing the received routing protocol control packet on the virtual gateway.

13. The method of claim 12, wherein the SDN comprises one or more virtual networks, each virtual network comprising one or more virtual machines.

14. The method of claim 13, further comprising sending routing information to the SDN controller in response to a virtual machine being one of added to or removed from the SDN, the SDN controller updating the routing information base according to the received routing information.

15. The method of claim 14, wherein the SDN controller updates the routing information base without configuring one or more physical components of an underlying network.

16. The method of claim 12, wherein the SDN comprises a Distributed Overlay Virtual Ethernet ("DOVE") network.

17. The method of claim 16, wherein the routing information base is sent to the one or more external routers using one of the virtual gateway, a DOVE management console, a DOVE connectivity service, and the SDN controller.

18. A program product comprising a non-transitory computer readable storage medium that stores code executable by a processor, the executable code comprising code to perform:
receiving a routing protocol control packet at a virtual gateway of a software defined network ("SDN"), the SDN comprising one or more virtual gateways that connect the SDN to one or more external networks;
forwarding the received routing protocol control packet to a controller for the SDN, the SDN controller updating a routing information base for the SDN based on the received routing protocol control packet; and
sending at least a portion of the routing information base to one or more external routers connected to the SDN,
wherein the routing information base is updated on the SDN controller without processing the received routing protocol control packet on the virtual gateway.

* * * * *